United States Patent
Shu et al.

(10) Patent No.: US 12,266,941 B1
(45) Date of Patent: Apr. 1, 2025

(54) INTEGRATED OFFSHORE POWER SUPPLY SYSTEM BASED ON CLEAN ENERGY

(71) Applicants: Ningbo Electric Power Design Institute Co. Ltd, Ningbo (CN); Ningbo Institute of Materials Technology & Engineering, Chinese Academy of Sciences, Ningbo (CN); Ningbo Yongyao Power Investment Corporation Co., Ltd, Ningbo (CN)

(72) Inventors: Kai Shu, Ningbo (CN); Wanbing Guan, Ningbo (CN); Jun Wu, Ningbo (CN); Xuanjun Chen, Ningbo (CN); Yueping Yang, Ningbo (CN); Yang Zhang, Ningbo (CN); Zixiang Pei, Ningbo (CN); Weitao Wang, Ningbo (CN); Haibo Bi, Ningbo (CN); Tiancheng Fan, Ningbo (CN); Yuting Liu, Ningbo (CN)

(73) Assignees: Ningbo Electric Power Design Institute Co. Ltd, Ningbo (CN); Ningbo Institute of Materials Technology & Engineering, Chinese Academy of Sciences, Ningbo (CN); Ningbo Yongyao Power Investment Corporation Co., Ltd, Ningbo (CN)

( * ) Notice: Subject to any disclaimer, the term of this patent is extended or adjusted under 35 U.S.C. 154(b) by 0 days.

(21) Appl. No.: 18/659,667

(22) Filed: May 9, 2024

(30) Foreign Application Priority Data

Feb. 19, 2024 (CN) .......................... 202410181834.0

(51) Int. Cl.
*H02J 3/38* (2006.01)
*F03B 13/26* (2006.01)
(Continued)

(52) U.S. Cl.
CPC .............. *H02J 3/381* (2013.01); *F03B 13/26* (2013.01); *H01M 8/04201* (2013.01);
(Continued)

(58) Field of Classification Search
CPC .......... H02J 3/38; H02J 3/381; H02J 2300/28; H02J 2300/24; F03B 13/26;
(Continued)

(56) References Cited

PUBLICATIONS

CN 202410181834.0, Grant of Notice of Patent Right for Invention, mailed Apr. 3, 2024, 3 pages. (with English translation).

*Primary Examiner* — Robert L Deberadinis
(74) *Attorney, Agent, or Firm* — Getech Law LLC; Jun Ye

(57) ABSTRACT

The present invention relates to the technical field of power generation of power systems, in particular to an offshore integrated power supply system based on clean energy. The integrated power supply system comprises a power generation unit for providing energy, an energy storage unit for storing energy, a load unit for consuming energy, an energy management system, and a fuel cell, wherein the power generation unit comprises a photovoltaic power generation system, a wind power generation system, and a tidal power generation system; the energy storage unit comprises hydrogen storage and a battery pack; and the energy management system connects the power generation unit, the load unit, and the energy storage unit, and allocates the surplus energy from the power generation unit to the hydrogen storage and the battery pack after satisfying the load unit.

7 Claims, 1 Drawing Sheet

(51) Int. Cl.
*H01M 8/04082* (2016.01)
*H01M 8/0656* (2016.01)
*H01M 16/00* (2006.01)

(52) U.S. Cl.
CPC ....... *H01M 8/0656* (2013.01); *H01M 16/006* (2013.01); *F05B 2220/61* (2013.01); *F05B 2220/708* (2013.01); *H01M 2220/10* (2013.01); *H01M 2250/10* (2013.01); *H01M 2250/402* (2013.01); *H02J 2300/24* (2020.01); *H02J 2300/28* (2020.01)

(58) Field of Classification Search
CPC ......... H01M 8/04201; H01M 8/04082; H01M 8/0656; H01M 16/006; H01M 16/00; H01M 2220/10; H01M 2250/10; H01M 2250/402; F05B 2220/61; F05B 2220/708
See application file for complete search history.

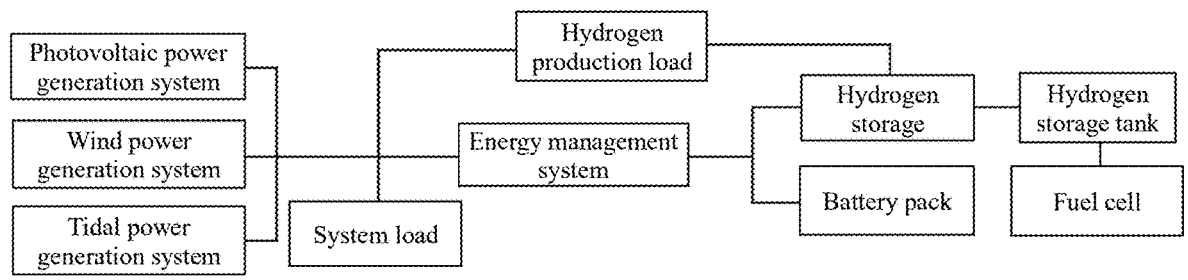

INTEGRATED OFFSHORE POWER SUPPLY SYSTEM BASED ON CLEAN ENERGY

TECHNICAL FIELD

The present invention relates to the technical field of power generation of power systems, in particular to an offshore integrated power supply system based on clean energy.

BACKGROUND

With the introduction of the carbon peaking and carbon neutrality goals, it has become inevitable to construct a clean, low-carbon, and efficient energy system as well as a new type of power system dominated by new energy sources, and the predominant role of renewable energy in future power systems has further been established. Currently, the proportion of solar power generation and wind power in China's power structure is increasing.

Solar power generation and wind power on isolated islands or offshore have strong temporal and random characteristics. The utilization of tidal energy has not yet reached a scale, easily leading to power deficits or power surpluses in clean energy, resulting in poor power supply reliability. Moreover, there are various types and combinations of energy storage systems. Improper capacity settings of the storage systems can lead to low utilization rates, high investments, and resource wastage.

SUMMARY

The present invention provides an offshore integrated power supply system based on clean energy to address the aforementioned issues.

Provided is an offshore integrated power supply system based on clean energy, comprising a power generation unit for providing energy, an energy storage unit for storing energy, a load unit for consuming energy, an energy management system, and a fuel cell;

wherein the power generation unit comprises a photovoltaic power generation system, a wind power generation system, and a tidal power generation system, and the tidal power generation system comprises a tidal reservoir and a tidal power generator set, wherein a water storage reservoir is provided at bottom of the tidal reservoir, and a water storage reservoir turbine, a water storage reservoir generator, and a water storage reservoir pump are provided between the tidal reservoir and the water storage reservoir; the water storage reservoir turbine is equipped with a valve, and the tidal power generation system, upon the closure of a water gate of the tidal reservoir during a rising tide, starts a water pump of the tidal reservoir to pump seawater from the rising tide into the tidal reservoir;

the energy storage unit comprises hydrogen storage and a battery pack, and hydrogen produced by the hydrogen storage serves as a feedstock for the fuel cell to generate electricity; power of the energy storage unit is optimized through an upper-layer model and a lower-layer model, wherein the upper-layer model decomposes remaining power of the power generation unit using a discrete Fourier transform on the basis that the power generation unit satisfies the load unit, obtaining storable power with a highest clean energy utilization rate; and the lower-layer model obtains cost of the energy storage unit through different power allocation modes of the hydrogen storage and the battery pack, and selects appropriate power for the hydrogen storage and the battery pack; the remaining power refers to the power that remains after the power generation unit has satisfied the load unit;

the load unit comprises a system load and a hydrogen production load for the hydrogen storage; and the energy management system connects the power generation unit, the load unit, and the energy storage unit, and allocates the remaining power to the hydrogen storage and the battery pack.

Output power of the photovoltaic power generation system mainly depends on local solar radiation quantity and temperature, and output power of a solar panel is expressed as:

$$P_{PV} = P_{STC} \frac{G_T}{G_{STC}}[1 + t_e(T_C - T_{STC})];$$

wherein, $P_{PV}$ represents power of the solar panel; $P_{STC}$ represents maximum test power under a standard test condition; GT represents incident radiation quantity of a photovoltaic panel; $G_{STC}$ represents light intensity under a standard test condition; $t_e$ represents a temperature coefficient; Tc represents an actual temperature; and $T_{STC}$ represents a standard temperature.

Relationship between output power of the wind power generation system and wind speed is expressed by the following piecewise function:

$$P_{WT} = \begin{cases} 0, V \geq V_{out} \text{ or } V \leq V_{in} \\ P_r \frac{V - V_{in}}{V_r - V_{in}}, V_{in} \leq V \leq V_r, \\ P_r, V_r \leq V \leq V_{out} \end{cases}$$

wherein, $P_{WT}$ represents the output power of the wind power generation system; $P_r$ represents rated power of the wind power generation system; V, $V_{in}$, and $V_{out}$ represent actual wind speed, cut-in wind speed, and cut-out wind speed, respectively; and $V_r$ represents rated wind speed.

Relationship between output power of the tidal power generation system and tidal flow velocity is expressed by the following function:

$$P_T = \begin{cases} 0, V_T \leq V_{ci} \\ \left(\frac{V_T - V_{ci}}{V_r - V_{ci}}\right)^3 \times P_r, V_{ci} \leq V_T \leq V_r; \\ P_r, V_r \leq V_T \end{cases}$$

wherein, $P_r$ represents the output power of the tidal power generation system; VT represents the tidal flow velocity; $V_{ci}$ and $V_r$ represent cut-in speed and rated speed of the tidal power generation system, respectively; and $P_r$ represents rated power of the tidal power generation system; and wherein, $$P_r = \frac{1}{2} \times \rho \times A \times C \times (V_T)^3;$$

in the above formula, ρ represents seawater density; A represents area swept by turbine blades of the tidal power generator set; and C represents an energy capture factor of the tidal power generator set.

Power generation process of the tidal power generation system comprises five stages:

in a first stage, opening the water gate of the tidal reservoir when hydraulic head is zero during a rising tide, seawater from the rising tide entering the tidal reservoir through the water gate, and water level in the tidal reservoir gradually rising; when the water level in the tidal reservoir is the same as water level of the seawater from the rising tide, closing the water gate of the tidal reservoir;

in a second stage, starting the water pump of the tidal reservoir upon the closure of the water gate of the tidal reservoir during the rising tide, to pump the seawater from the rising tide into the tidal reservoir;

in a third stage, the water gate and a turbine of the tidal reservoir remaining closed, waiting for a next stage of action;

in a fourth stage, opening the water gate of the tidal reservoir and the tidal reservoir turbine when water level difference between the seawater and the tidal reservoir reaches an optimal hydraulic head value during a falling tide, and discharging water from the tidal reservoir outward to drive the tidal reservoir turbine for power generation; the water level in the reservoir dropping, and output of the tidal power generator set gradually increasing until the water level difference between the seawater and the tidal reservoir reaches a minimum operational hydraulic head, at which point the water gate of the tidal reservoir and the tidal reservoir turbine are closed; and in a fifth stage, the water gate of the tidal reservoir and the tidal reservoir turbine remaining closed, waiting for a tide rise, and entering a next cycle when the hydraulic head is zero.

During the water pumping period of the rising tide in the second stage, remaining electric energy generated by the power generation unit, after meeting electric energy consumed by the load unit and electric energy stored in the energy storage unit, is used to drive the water storage reservoir pump to pump water from the water storage reservoir to the tidal reservoir.

The hydrogen storage uses solid polymer electrolysis of water to produce hydrogen.

The upper-layer model obtains a first frequency offset point for storable power and a battery, and the lower-layer model obtains a second frequency offset point for the battery pack and the hydrogen storage.

Steps for determining the first frequency offset point and the second frequency offset point are as follows:

S1. performing the discrete Fourier transform on the remaining power of the power generation unit to determine the storable power with the highest clean energy utilization rate;

S2. determining a range for the first frequency offset point meeting a fluctuation requirement of the storable power, and selecting a first frequency offset point with the highest clean energy utilization rate;

S3. determining a range for the second frequency offset point based on the selected first frequency offset point;

S4. solving the upper-layer model and the lower-layer model of the energy storage unit using a genetic algorithm; and S5. selecting a second frequency offset point with a lowest energy storage unit cost to determine power allocation for the hydrogen storage and the battery pack.

The first frequency offset point $n_1$ is less than the second frequency offset point $n_2$, and relationship between maximum frequency $f_{max}$ suitable for compensation by the battery pack and minimum frequency $f_{min}$ suitable for compensation by the hydrogen storage should also meet:

$$f_{min} < n_2 f_s/T < f_{max},$$

wherein, $f_s$ represents sampling frequency of the remaining power of the power generation unit, and T represents a number of sampling points of the remaining power of the power generation unit.

The technical solutions provided by the present invention may include the following beneficial effects:

1. In the present application, a water storage reservoir is provided at the bottom of the tidal reservoir where the tidal power generation system is located, which is equivalent to combining tidal power generation with pumped storage. In the first stage, when the water level in the tidal reservoir is the same as that of the seawater from the rising tide, the water storage reservoir at the bottom of the tidal reservoir is naturally in a full water state. During the water pumping period of the rising tide in the second stage, or during periods of lower grid electricity prices or output peaks, the remaining electricity generated by the integrated power supply system, in the case that its electric energy is greater than the consumption of the load unit and the storage of the energy storage unit, may be used to drive the water storage reservoir pump to pump out the water from the water storage reservoir. The water level in the tidal reservoir rises, increasing the net electrical energy gain during the power generation period. This allows for the release of energy at any time to meet load demands or improve uncertainty in output during certain moments, adjusting the system output, and thus achieving continuous and uninterrupted power generation. Therefore, the tidal power generation system of the present application, while fully utilizing tidal energy, overcomes the intermittency of tidal power generation, effectively mitigates the adverse effects of clean energy on offshore power supply, enhances the flexibility of power supply, and ensures safe and stable operation.

2. Compared to the prior art, the most significant difference of the tidal power generation system in the present application lies in the second stage, where seawater from the rising tide is pumped into the tidal reservoir using the water pump of the tidal reservoir. The water pumping is based on the water level in the tidal reservoir being the same as that of the seawater from the rising tide, allowing for water pumping with a smaller lift head. After the tide falling, a greater water level difference is achieved for power generation. The amount of electricity generated is greater than the amount of electricity consumed by water pumping, thereby increasing the electric energy. Moreover, the efficiency of tidal energy utilization is effectively improved without significantly increasing costs.

3. In the present application, the power of the energy storage unit is optimized through an upper-layer model and a lower-layer model. The upper-layer model decomposes the remaining power using the discrete Fourier transform on the basis that the power generation unit satisfies the load unit, obtaining the storable power with the highest clean energy utilization rate. The lower-layer model obtains the cost of the energy storage unit through different power allocation modes of the hydrogen storage and the battery pack, and selects the appropriate power for the hydrogen storage and the battery pack. Throughout the year, the system's power deficit or power surplus meets the requirement, effectively improving the utilization rate of clean energy and greatly improving the reliability of the power supply system. The integrated configuration of clean energy with batteries and hydrogen storage in the present application provides the capacity and power that can balance the economic efficiency and the assurance of safe and stable operation of the system.

4. In the present application, the reasonable configuration of the battery and the hydrogen storage in the energy storage unit, achieved through the first frequency offset point and the second frequency offset point, can avoid the excessive charge and discharge of the battery, reducing its lifespan loss and extending its service life. Meanwhile, such configuration fully utilizes the characteristics of hydrogen storage to promote the conversion of energy storage forms while storing the remaining power, thereby improving the efficiency of energy storage.

5. The present application proposes to combine the tidal power generation system with the energy storage unit, enriching the methods for utilizing clean energy, significantly improving the efficiency of clean energy utilization, and effectively enhancing the stability and economic efficiency of the integrated power supply system.

BRIEF DESCRIPTION OF THE DRAWINGS

To clarify the technical solutions of the embodiments of the present invention, a brief introduction of the drawing to be used in the description of the embodiments will be provided below. It is evident that the drawing described below is only for some embodiments of the present invention. For those skilled in the art, additional drawings may be obtained based on the drawing without creative efforts.

FIG. 1 is a schematic diagram of an integrated power supply system according to the present invention.

DETAILED DESCRIPTION

To make the objectives, technical solutions, and advantages of the embodiments of the present application clearer, the technical solutions in the embodiments of the present application will be clearly and completely described below with reference to the drawing in the embodiments of the present application. It is evident that the described embodiments are some, but not all embodiments of the present application. Components of the embodiments of the present application generally described and illustrated in the drawing herein may be arranged and designed in various configurations.

Therefore, the following detailed description of the embodiments of the present application provided in the drawing is not intended to limit the scope of the present application as claimed, but merely represents selected embodiments of the present application. Based on the embodiments of the present application, all other embodiments obtained by those skilled in the art without creative work shall fall within the protection scope of the present application.

It should be noted that similar reference numerals and letters refer to similar items in the following drawings, and thus, once an item is defined in one figure, it need not be further defined or explained in the subsequent drawings.

It should be noted that the term "comprising" or any other variants are intended to cover non-exclusive inclusion. Thus, a process, method, item, or device comprising a series of elements includes not only those elements but also other elements not explicitly listed, or elements inherent to such process, method, item, or device. Without further limitation, an element defined by the phrase "including a . . ." does not exclude the presence of additional identical elements in the process, method, item, or device that includes the element.

In conjunction with FIG. 1, detailed explanations of some embodiments of the present application are provided below. Unless conflicting, the features in the following embodiments may be combined with each other.

An offshore integrated power supply system based on clean energy is provided according to the embodiments to address the aforementioned issues.

An offshore integrated power supply system based on clean energy is provided. The integrated power supply system comprises a power generation unit for providing energy, an energy storage unit for storing energy, a load unit for consuming energy, an energy management system, and a fuel cell.

The power generation unit comprises a photovoltaic power generation system, a wind power generation system, and a tidal power generation system.

The output power of the photovoltaic power generation system mainly depends on the local solar radiation quantity and the ambient temperature. The output power of the solar panel may be expressed as:

$$P_{PV} = P_{STC} \frac{G_T}{G_{STC}} [1 + t_e(T_C - T_{STC})];$$

wherein, $P_{PV}$ represents the power of the solar panel; $P_{STC}$ represents the maximum test power under the standard test condition; GT represents the incident radiation quantity of the photovoltaic panel; $G_{STC}$ represents the light intensity under the standard test condition; $t_e$ represents the temperature coefficient; Tc represents the actual temperature; and $T_{STC}$ represents the standard temperature.

The present application uses photovoltaic cell panels with the model BP-Solar3200, with a rated power of 200 W and a lifespan of 20 years.

The relationship between the output power of the wind power generation system and the wind speed is expressed by the following piecewise function:

$$P_{WT} = \begin{cases} 0, V \geq V_{out} \text{ or } V \leq V_{in} \\ P_r \frac{V - V_{in}}{V_r - V_{in}}, V_{in} \leq V \leq V_r, \\ P_r, V_r \leq V \leq V_{out} \end{cases}$$

wherein, $P_{WT}$ represents the output power of the wind power generation system; $P_r$ represents the rated power of the wind power generation system; V, $V_{in}$, and $V_{out}$ represent the actual wind speed, cut-in wind speed, and cut-out wind speed, respectively; and $V_r$ represents the rated wind speed.

The document uses a wind power generator with the model PGE10KW, with a rated power of 10 kW and a lifespan of 15 years.

The relationship between the output power of the tidal power generation system and the tidal flow velocity may be expressed by the following function:

$$P_T = \begin{cases} 0, V_T \leq V_{ci} \\ \left(\frac{V_T - V_{ci}}{V_r - V_{ci}}\right)^3 \times P_r, V_{ci} \leq V_T \leq V_r; \\ P_r, V_r \leq V_T \end{cases}$$

wherein, $P_T$ represents the output power of the tidal power generation system; VT represents the tidal flow velocity; $V_{ci}$ and $V_r$ represent the cut-in speed and rated speed of the tidal power generation system, respectively; and $P_r$ represents the rated power of the tidal power generation system; and wherein, $$P_r = \frac{1}{2} \times \rho \times A \times C \times (V_T)^3.$$

In the above formula, ρ represents seawater density; A represents the area swept by the turbine blades of the tidal power generator set; and C represents the energy capture factor of the tidal power generator set, typically taken as 0.4-0.5.

Tidal energy, in comparison to solar and wind energy, boasts a more pronounced predictability due to its strong periodicity in time and the regularity in the heights of high and low tides.

The tidal power generation system comprises a tidal reservoir and a tidal power generator set. To make better use of tidal energy and overcome the intermittency of tidal power generation, the present application proposes providing a water storage reservoir at the bottom of the tidal reservoir where the tidal power generation system is located. A water storage reservoir turbine, a water storage reservoir generator, and a water storage reservoir pump are provided between the tidal reservoir and the water storage reservoir. The water storage reservoir turbine is equipped with a valve. During a rising tide, there is a significant pressure difference between the seabed and the sea surface. After seawater enters the tidal reservoir, it drives the turbine of the tidal power generator set to rotate and flows into the water storage reservoir, providing power for the generator. When the electric energy generated by the integrated power supply system is greater than the consumption of the load unit and the storage of the energy storage unit, the water storage reservoir pump may pump seawater from the water storage reservoir to the tidal reservoir to consume the excess power. When the electrical energy generated by the integrated power supply system is insufficient to meet the demands of the load unit, water may flow from the tidal reservoir to the water storage reservoir, driving the water storage reservoir turbine to rotate and providing power to the water storage reservoir generator.

In the unidirectional falling tide power generation mode, the power generation process of the tidal power generation system of the present application comprises five stages:

In the first stage, the water gate of the tidal reservoir is opened when the hydraulic head is zero during the rising tide, seawater from the rising tide enters the tidal reservoir through the water gate, and the water level in the tidal reservoir gradually rises; when the water level in the tidal reservoir is the same as the water level of the seawater from the rising tide, the water gate of the tidal reservoir is closed.

In the second stage, the water pump of the tidal reservoir is started upon the closure of the water gate of the tidal reservoir during the rising tide to pump the seawater from the rising tide into the tidal reservoir.

In the third stage, the water gate and the turbine of the tidal reservoir remain closed, waiting for the next stage of action.

In the fourth stage, the water gate of the tidal reservoir and the tidal reservoir turbine are opened when the water level difference between the seawater and the tidal reservoir reaches the optimal hydraulic head value during a falling tide, and water from the tidal reservoir is discharged outward to drive the turbine for power generation. The water level in the reservoir drops, and the output of the tidal power generator set gradually increases until the water level difference between the seawater and the tidal reservoir reaches the minimum operational hydraulic head, at which point the water gate of the tidal reservoir and the tidal reservoir turbine are closed.

In the fifth stage, the water gate of the tidal reservoir and the tidal reservoir turbine remain closed, waiting for a tide rise, and entering the next cycle when the hydraulic head is zero.

Compared to the prior art, the most significant difference of the tidal power generation system in the present application lies in the water pumping in the second stage. The water pumping is based on the water level in the tidal reservoir being the same as that of the seawater from the rising tide, allowing for water pumping with a smaller lift head. After the tide falls, a greater water level difference is achieved for power generation. The amount of electricity generated is greater than the amount of electricity consumed by water pumping, thereby increasing the electric energy. The larger the tidal range, the more the net electric energy gain.

In the first stage, when the water level in the tidal reservoir is the same as that of the seawater from the rising tide, the water storage reservoir at the bottom of the tidal reservoir is naturally in a full water state. It may be considered that during the water pumping period of the rising tide in the second stage, or during periods of lower grid electricity prices or output peaks, the remaining electricity generated by the integrated power supply system, in the case that its electric energy is greater than the consumption of the load unit and the storage of the energy storage unit, is used to drive the water storage reservoir pump to pump out the water from the water storage reservoir. The water level in the tidal reservoir rises, increasing the net electrical energy gain during the power generation period. This allows for the release of energy at any time to meet load demands or improve uncertainty in output during certain moments, adjusting the system output, and thus achieving continuous and uninterrupted power generation.

The tidal power generation system of the present application is the equivalent of the combination of tidal power generation with pumped storage. The water storage reservoir serves as the lower reservoir for pumped storage, while the tidal reservoir serves as the upper reservoir for pumped storage. The tidal power generation system of the present application, while fully utilizing tidal energy, effectively mitigates the adverse effects of renewable energy on offshore power supply, enhances the flexibility of the power supply, and ensures safe and stable operation.

The photovoltaic power generation system, wind power generation system, and tidal power generation system serve as important components of the microgrid, providing renewable clean energy to the load. When there is excess electric energy generated by the photovoltaic power generation system, wind power generation system, and tidal power generation system after supplying the load unit, the excess electric energy is stored in the energy storage unit. If the electric energy generated by the power generation systems is insufficient to meet the demand of the load unit, the power is supplemented by the energy storage unit and the fuel cell to assist the power generation unit.

The energy storage unit comprises hydrogen storage and a battery pack. The hydrogen storage uses solid polymer electrolysis of water to produce hydrogen, which serves as a feedstock for the fuel cell to generate electricity.

Based on different electrolytes, the main methods of hydrogen production by electrolysis used comprise alkaline water electrolysis, solid polymer electrolysis of water, and high-temperature solid oxide electrolysis. The high-temperature solid oxide method for hydrogen production requires high-temperature conditions, which leads to high costs and makes it unsuitable for integrated power supply systems based on clean energy. The alkaline water electrolysis technology for hydrogen production, due to its alkaline nature, can lead to environmental pollution issues and is also unsuitable for integrated power supply systems based on clean energy. The hydrogen storage based on solid polymer electrolysis of water has the characteristics of compact structure and high efficiency, and does not require stringent operating conditions. Therefore, it is suitable for offshore integrated power supply systems based on clean energy.

The load unit comprises a system load and a hydrogen production load for the hydrogen storage.

The power generation unit supplies power to the load unit. The hydrogen production load in the load unit is the load for hydrogen storage based on solid polymer electrolysis of water. Solid polymer electrolysis of water produces a large amount of hydrogen, which is stored in a hydrogen storage tank. The stored hydrogen may serve as a feedstock for fuel cells to supply power to the load unit on the island. Moreover, the freshwater produced by the hydrogen fuel cells can be treated and then supplied for offshore water use.

The energy management system allocates excess energy to the hydrogen storage and the battery pack for energy storage.

Hydrogen produced by hydrogen storage based on electrolysis of seawater is compressed by the hydrogen compressor of the hydrogen storage system and then stored in a hydrogen storage tank to serve as a feedstock for fuel cells for electricity generation.

Based on climate and weather conditions, decisions are made to deploy a wave power generator set, a wind power generator set, and a tidal power generator set, connecting them to external loads.

The power of the energy storage unit is optimized through an upper-layer model and a lower-layer model. The upper-layer model decomposes the remaining power using the discrete Fourier transform on the basis that the power generation unit satisfies the load unit, obtaining the storable power with the highest clean energy utilization rate. The lower-layer model obtains the cost of the energy storage unit through different power allocation modes of the hydrogen storage and the battery pack, and selects the appropriate power for the hydrogen storage and the battery pack.

The discrete Fourier transform can convert a time-domain signal into a frequency-domain signal, transforming and decomposing the storable power to obtain the amplitude-frequency characteristics thereof. The direct current component and low-frequency fluctuations of the load are compensated by the storable power, while the remainder is compensated by the battery pack and hydrogen storage. Based on the division of the compensation frequency range, the amplitude outside the compensation frequency band is set to zero, while the amplitude corresponding to the compensation frequency band remains unchanged. This is then converted back into the time domain through inverse Fourier transform, thereby obtaining the storable power and the compensation power allocated to the battery pack and hydrogen storage.

The objective of the upper-layer model is to obtain a first frequency offset point for the storable power and the battery. The objective of the lower-layer model is to obtain a second frequency offset point for the battery pack and the hydrogen storage.

The process for determining the first frequency offset point and the second frequency offset point is as follows:
1. performing the discrete Fourier transform on the remaining power of the power generation unit to determine the storable power with the highest clean energy utilization rate;
2. determining the range for the first frequency offset point that meets the fluctuation requirements of the storable power, and selecting a first frequency offset point with the highest clean energy utilization rate;
3. determining the range for the second frequency offset point based on the first frequency offset point;
4. solving the upper-layer model and the lower-layer model of the energy storage unit using a genetic algorithm; and
5. selecting a second frequency offset point with the lowest energy storage unit cost to determine the power allocation for the hydrogen storage and the battery pack.

The second frequency offset point for the battery pack and the hydrogen storage should ensure that the battery pack and the hydrogen storage both operate at proper power and both smooth out their corresponding frequency fluctuation ranges. Therefore, based on ensuring that the first frequency offset point $n_1$ is less than the second frequency offset point $n_2$, the relationship between the maximum frequency $f_{max}$ suitable for compensation by the battery pack and the minimum frequency $f_{min}$ suitable for compensation by the hydrogen storage should also meet:

$$f_{min} < n_2 f_s/T < f_{max},$$

wherein, $f_s$ represents the sampling frequency of the remaining power of the power generation unit, and T represents the number of sampling points of the remaining power of the power generation unit.

Taking a microgrid on a certain island as an example, a typical day's data was selected for analysis with a sampling duration of 1 minute to obtain the remaining power of the integrated power supply system. The remaining power was subjected to the discrete Fourier transform, and solved using the upper-layer model and the lower-layer model. Based on the fluctuation requirements of the storable power, the value range of the first frequency offset point was determined, and the first frequency offset point with the highest clean energy utilization rate was selected from the value range. In this case, the value of the first frequency offset point was 9 with a clean energy utilization rate of 0.69. With the first frequency offset point determined, the battery is suitable for smoothing out hourly fluctuations, while hydrogen storage is suitable for smoothing out minute-level fluctuations. The value range for the second frequency offset point was also determined as [10, 144]. For different values, the optimization of the energy storage unit capacity was conducted. The cost of the energy storage unit varied with the change in the second frequency offset point, from which the second frequency offset point with the lowest energy storage unit cost was selected as the final second frequency offset point for the battery and hydrogen storage. The corresponding second frequency offset point was 60, with rated powers for the battery and the hydrogen storage being 15.58 kW and 9.78 kW respectively, rated capacities being 35.15 kW·h and 1.03 kW·h respectively, and the cost of the energy storage unit being 15273 yuan. Throughout the year, the system's power deficit or power surplus met the requirement, greatly improving system reliability. The integrated configuration of clean energy with batteries and hydrogen storage in the present case provides the capacity and power that can balance the most economic efficiency and the assurance of safe and stable operation of the system. The result indicates that the capacity configuration of the battery and the hydrogen storage can avoid the excessive charge and discharge of the battery, reducing its lifespan loss and extending its service life. In addition, hydrogen storage exhibits a slower variation in SOC values compared to batteries. This is because hydrogen storage can smooth out the frequency bands with the lowest frequency variation in system imbalance power, which corresponds to the slowest variations in SOC values.

The above are only preferred embodiments of the present application, and are not intended to limit the present application. For those skilled in the art, the present application can be modified and varied in various ways. Any modification, equivalent substitution, improvement, and the like made within the spirit and principle of the present application shall all fall within the protection scope of the present application.

For those skilled in the art, it is evident that the present application is not limited to the details of the exemplary embodiments described above. Moreover, the present application can be implemented in other specific forms without departing from the spirit or essential characteristics of the present application. Therefore, from any perspective, the embodiments should be considered exemplary and non-limiting. The scope of the present application is defined by the appended claims rather than the above description. All changes falling within the meaning and scope of equivalency of the claims are therefore intended to be embraced herein. No reference numeral in the claims should be construed as limiting the claims concerned.

The invention claimed is:

1. An offshore integrated power supply system based on clean energy, comprising a power generation unit for providing energy, an energy storage unit for storing energy, a load unit for consuming energy, an energy management system, and a fuel cell;
wherein the power generation unit comprises a photovoltaic power generation system, a wind power generation system, and a tidal power generation system, and the tidal power generation system comprises a tidal reservoir and a tidal power generator set, wherein a water storage reservoir is provided at bottom of the tidal reservoir, and a water storage reservoir turbine, a water storage reservoir generator, and a water storage reservoir pump are provided between the tidal reservoir and the water storage reservoir; the water storage reservoir turbine is equipped with a valve, and the tidal power generation system, upon the closure of a water gate of the tidal reservoir during a rising tide, starts a water pump of the tidal reservoir to pump seawater from the rising tide into the tidal reservoir;
the energy storage unit comprises hydrogen storage and a battery pack, and hydrogen produced by the hydrogen storage serves as a feedstock for the fuel cell to generate electricity; power of the energy storage unit is optimized through an upper-layer model and a lower-layer model, wherein the upper-layer model decomposes remaining power of the power generation unit using a discrete Fourier transform on the basis that the power generation unit satisfies the load unit, obtaining storable power with a highest clean energy utilization rate; and the lower-layer model obtains cost of the energy storage unit through different power allocation modes of the hydrogen storage and the battery pack, and selects appropriate power for the hydrogen storage and the battery pack; the remaining power refers to the power that remains after the power generation unit has satisfied the load unit;
the load unit comprises a system load and a hydrogen production load for the hydrogen storage; and
the energy management system connects the power generation unit, the load unit, and the energy storage unit, and allocates the remaining power to the hydrogen storage and the battery pack;
the upper-layer model obtains a first frequency offset point for storable power and a battery, and the lower-layer model obtains a second frequency offset point for the battery pack and the hydrogen storage;
steps for determining the first frequency offset point and the second frequency offset point are as follows:
S1. performing the discrete Fourier transform on the remaining power of the power generation unit to determine the storable power with the highest clean energy utilization rate;
S2. determining a range for the first frequency offset point meeting a fluctuation requirement of the storable power, and selecting a first frequency offset point with the highest clean energy utilization rate;
S3. determining a range for the second frequency offset point based on the selected first frequency offset point;
S4. solving the upper-layer model and the lower-layer model of the energy storage unit using a genetic algorithm; and
S5. selecting a second frequency offset point with a lowest energy storage unit cost to determine power allocation for the hydrogen storage and the battery pack.

2. The offshore integrated power supply system based on clean energy according to claim 1, wherein output power of the photovoltaic power generation system mainly depends on local solar radiation quantity and temperature, and output power of a solar panel is expressed as:

$$P_{PV} = P_{STC} \frac{G_T}{G_{STC}} [1 + t_e(T_C - T_{STC})];$$

wherein, $P_{PV}$ represents power of the solar panel; $P_{STC}$ represents maximum test power under a standard test condition; $G_T$ represents incident radiation quantity of a photovoltaic panel; $G_{STC}$ represents light intensity under a standard test condition; $t_e$ represents a temperature coefficient; $T_C$ represents an actual temperature; and $T_{STC}$ represents a standard temperature.

3. The offshore integrated power supply system based on clean energy according to claim 1, wherein relationship between output power of the tidal power generation system and tidal flow velocity is expressed by the following function:

$$P_T = \begin{cases} 0, V_T \le V_{ci} \\ \left(\frac{V_T - V_{ci}}{V_r - V_{ci}}\right)^3 \times P_r, V_{ci} \le V_T \le V_r ; \\ P_r, V_r \le V_T \end{cases}$$

wherein, $P_T$ represents the output power of the tidal power generation system; $V_T$ represents the tidal flow velocity; $V_{ci}$ and $V_r$ represent cut-in speed and rated speed of the tidal power generation system, respectively; and $P_r$ represents rated power of the tidal power generation system; and wherein, $$P_r = \frac{1}{2} \times \rho \times A \times C \times (V_T)^3;$$

in the above formula, $\rho$ represents seawater density; A represents area swept by turbine blades of the tidal power generator set; and C represents an energy capture factor of the tidal power generator set.

4. The offshore integrated power supply system based on clean energy according to claim 3, wherein power generation process of the tidal power generation system comprises five stages:
  in a first stage, opening the water gate of the tidal reservoir when hydraulic head is zero during a rising tide, seawater from the rising tide entering the tidal reservoir through the water gate, and water level in the tidal reservoir gradually rising; when the water level in the tidal reservoir is the same as water level of the seawater from the rising tide, closing the water gate of the tidal reservoir;
  in a second stage, starting the water pump of the tidal reservoir upon the closure of the water gate of the tidal reservoir during the rising tide, to pump the seawater from the rising tide into the tidal reservoir;
  in a third stage, the water gate and a turbine of the tidal reservoir remaining closed, waiting for a next stage of action;
  in a fourth stage, opening the water gate of the tidal reservoir and the tidal reservoir turbine when water level difference between the seawater and the tidal reservoir reaches an optimal hydraulic head value during a falling tide, and discharging water from the tidal reservoir outward to drive the tidal reservoir turbine for power generation; the water level in the reservoir dropping, and output of the tidal power generator set gradually increasing until the water level difference between the seawater and the tidal reservoir reaches a minimum operational hydraulic head, at which point the water gate of the tidal reservoir and the tidal reservoir turbine are closed; and
  in a fifth stage, the water gate of the tidal reservoir and the tidal reservoir turbine remaining closed, waiting for a tide rise, and entering a next cycle when the hydraulic head is zero.

5. The offshore integrated power supply system based on clean energy according to claim 4, wherein during the water pumping period of the rising tide in the second stage, remaining electric energy generated by the power generation unit, after meeting electric energy consumed by the load unit and electric energy stored in the energy storage unit, is used to drive the water storage reservoir pump to pump water from the water storage reservoir to the tidal reservoir.

6. The offshore integrated power supply system based on clean energy according to claim 1, wherein the hydrogen storage uses solid polymer electrolysis of water to produce hydrogen.

7. The offshore integrated power supply system based on clean energy according to claim 1, wherein the first frequency offset point $n_1$ is less than the second frequency offset point $n_2$, and relationship between maximum frequency $f_{max}$ suitable for compensation by the battery pack and minimum frequency $f_{min}$ suitable for compensation by the hydrogen storage should also meet:

$$f_{min} \leq n_2 f_s / T \leq f_{max};$$

wherein, $f_s$ represents sampling frequency of the remaining power of the power generation unit, and T represents a number of sampling points of the remaining power of the power generation unit.

* * * * *